(12) United States Patent
Ziebell

(10) Patent No.: US 6,385,768 B1
(45) Date of Patent: May 7, 2002

(54) SYSTEM AND METHOD FOR INCORPORATING CHANGES AS A PART OF A SOFTWARE RELEASE

(75) Inventor: Jonathan Virgil Ziebell, Trabuco Canyon, CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/409,106

(22) Filed: Sep. 30, 1999

(51) Int. Cl.$^7$ ................................................. G06F 9/44
(52) U.S. Cl. ........................ 717/121; 717/122; 707/203
(58) Field of Search ................................ 717/1, 2, 3, 4, 717/11, 120, 121, 122, 168, 170; 707/200–204, 511

(56) References Cited

U.S. PATENT DOCUMENTS

| | | | | |
|---|---|---|---|---|
| 5,649,200 A | * | 7/1997 | Leblang et al. | 395/703 |
| 5,675,802 A | * | 10/1997 | Allen et al. | 395/703 |
| 5,706,510 A | * | 1/1998 | Burgoon | 707/203 |
| 5,787,444 A | * | 7/1998 | Gerken et al. | 707/203 |
| 5,950,209 A | * | 9/1999 | Carrier, III et al. | 707/203 |
| 5,956,732 A | * | 9/1999 | Tsuchida | 707/203 |
| 5,970,503 A | * | 10/1999 | Eisenberg | 707/203 |
| 6,035,297 A | * | 3/2000 | Van Huben et al. | 707/8 |
| 6,209,128 B1 | * | 3/2001 | Gerard et al. | 717/11 |
| 6,256,773 B1 | * | 7/2001 | Bowman-Amuah | 717/1 |
| 6,272,678 B1 | * | 8/2001 | Imachi et al. | 717/11 |

OTHER PUBLICATIONS

Dart, "Concepts in configuration management systems", ACM, 1991, pp 1–18.*
Zeller et al., "Unified versionning through feature logic", ACM, 1997, pp 398–441.*
Nicklin, "Managing multi-variant software configurations", ACM, 1991, pp 53–57.*
Heberling, "Software change management", Software Development, Jul. 1999, pp 7–11.*
Merusi, "Intersolv's PVCS version manager", "Performance Computing", Jun. 1998, pp 61–66.*
Hanna, "Beyond version control", Software Magazine, Sep. 1996, pp 45–50.*
Vacca, "Programmers persue change control", Software Magazine, Aug. 1993, pp 41–52.*

* cited by examiner

*Primary Examiner*—Kakali Chaki
(74) *Attorney, Agent, or Firm*—Alfred W. Kozak; Mark T. Starr; Lise A. Rode

(57) ABSTRACT

Disclosed is a method in a computer system capable of executing a version control program, wherein the method operates within the version control program for incorporating changes to software releases. The method creates a project archive object that manages all resources for each of the software releases and then creates a branch in the project archive object in order to establish a new project revision object of the project archive objects. Next, a project revision object is established and is disposed on the branch for incorporating a revision of the project archive object. After this, archive objects are added to the project revision object and revisions are received from a user to each of the archive objects. A change object is established for the project revision, which logically groups a set of revisions to be released. A stream is then created from the project revision object in order to establish a new project revision object of the project archive object, thereby establishing the new project revision object as a software release object. The software release object is then disposed on the stream for incorporating a revision of the project archive object. Finally, the change object is applied to the software release object after it is determined that a change is ready for release.

12 Claims, 14 Drawing Sheets

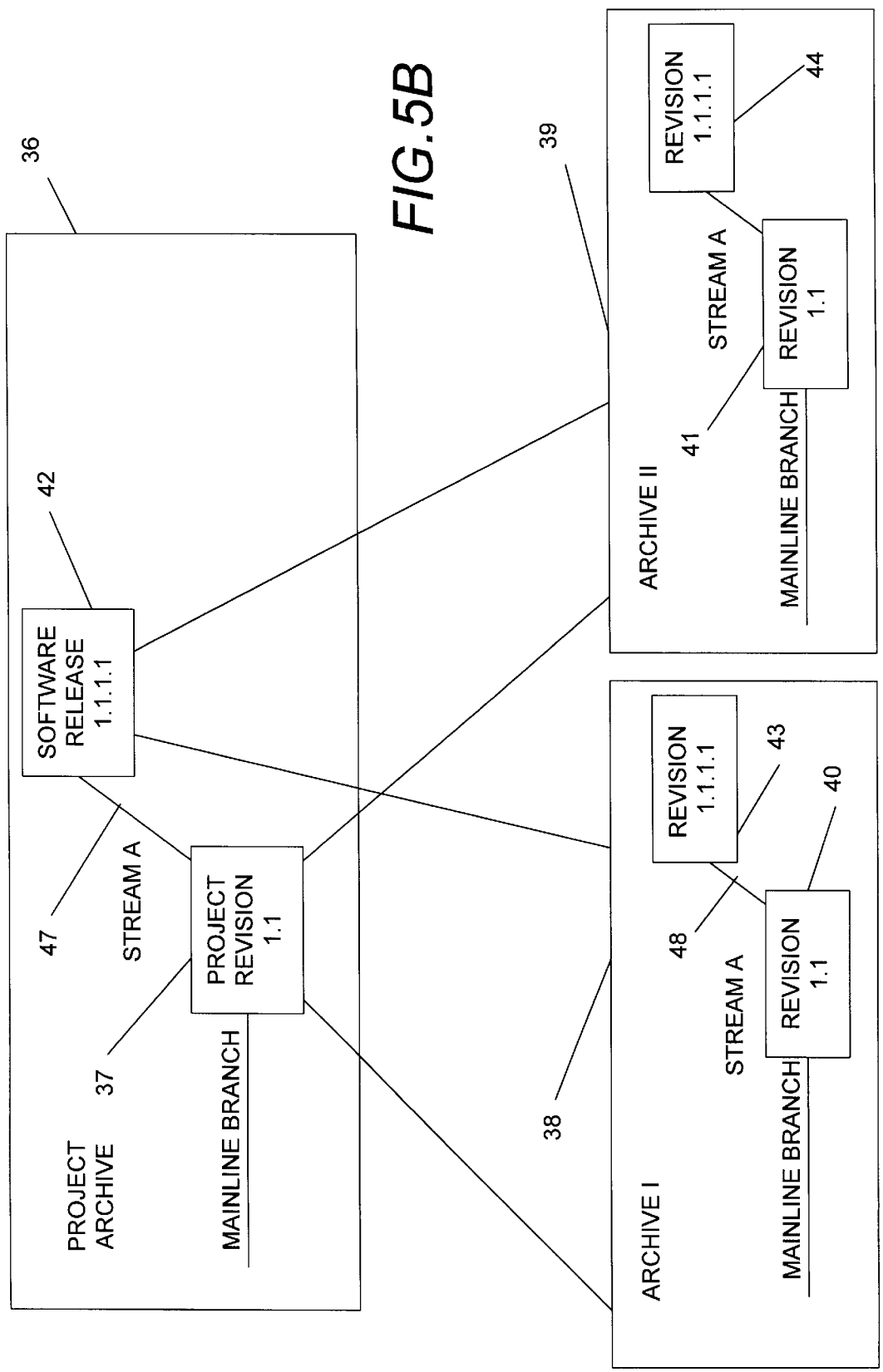

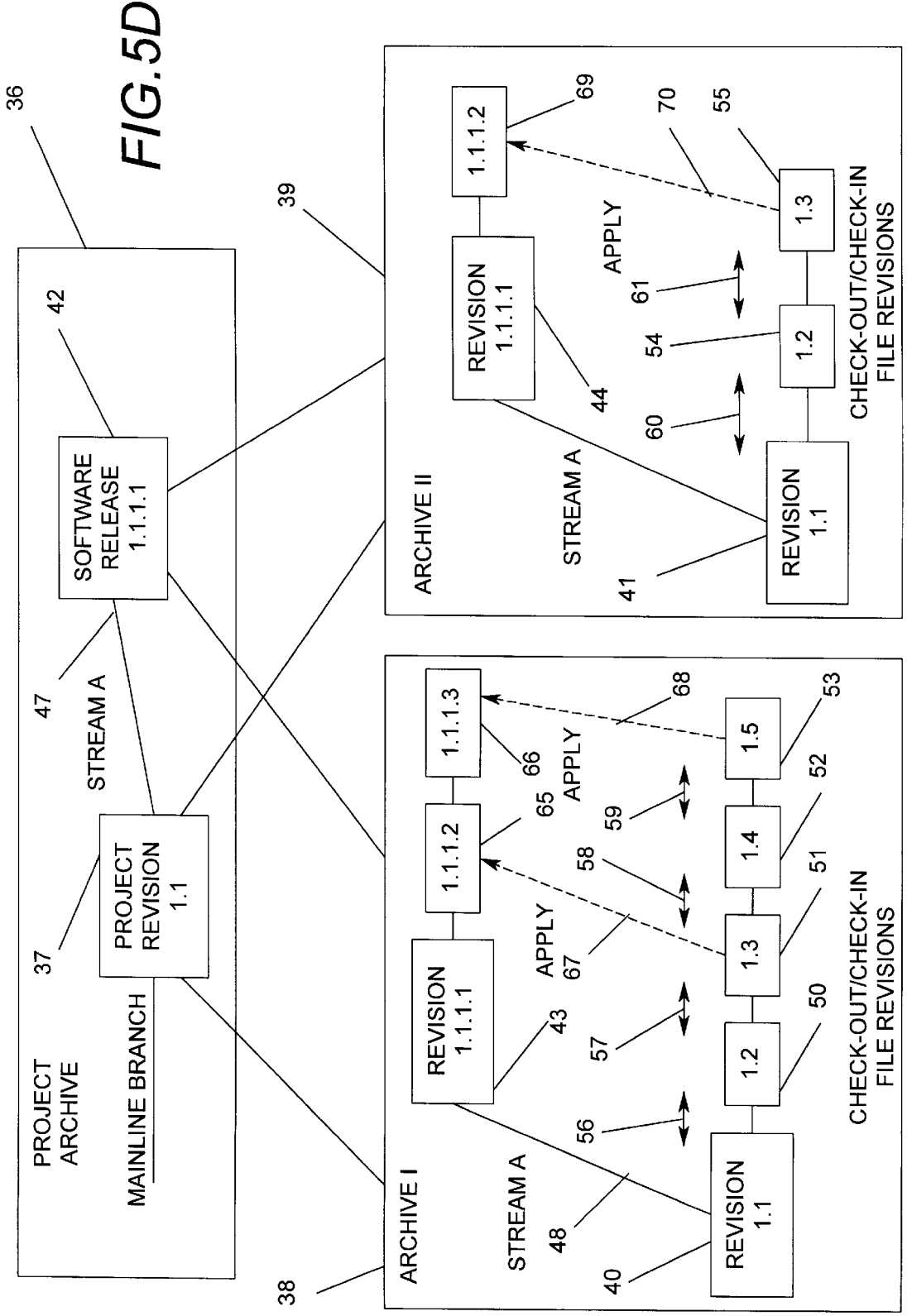

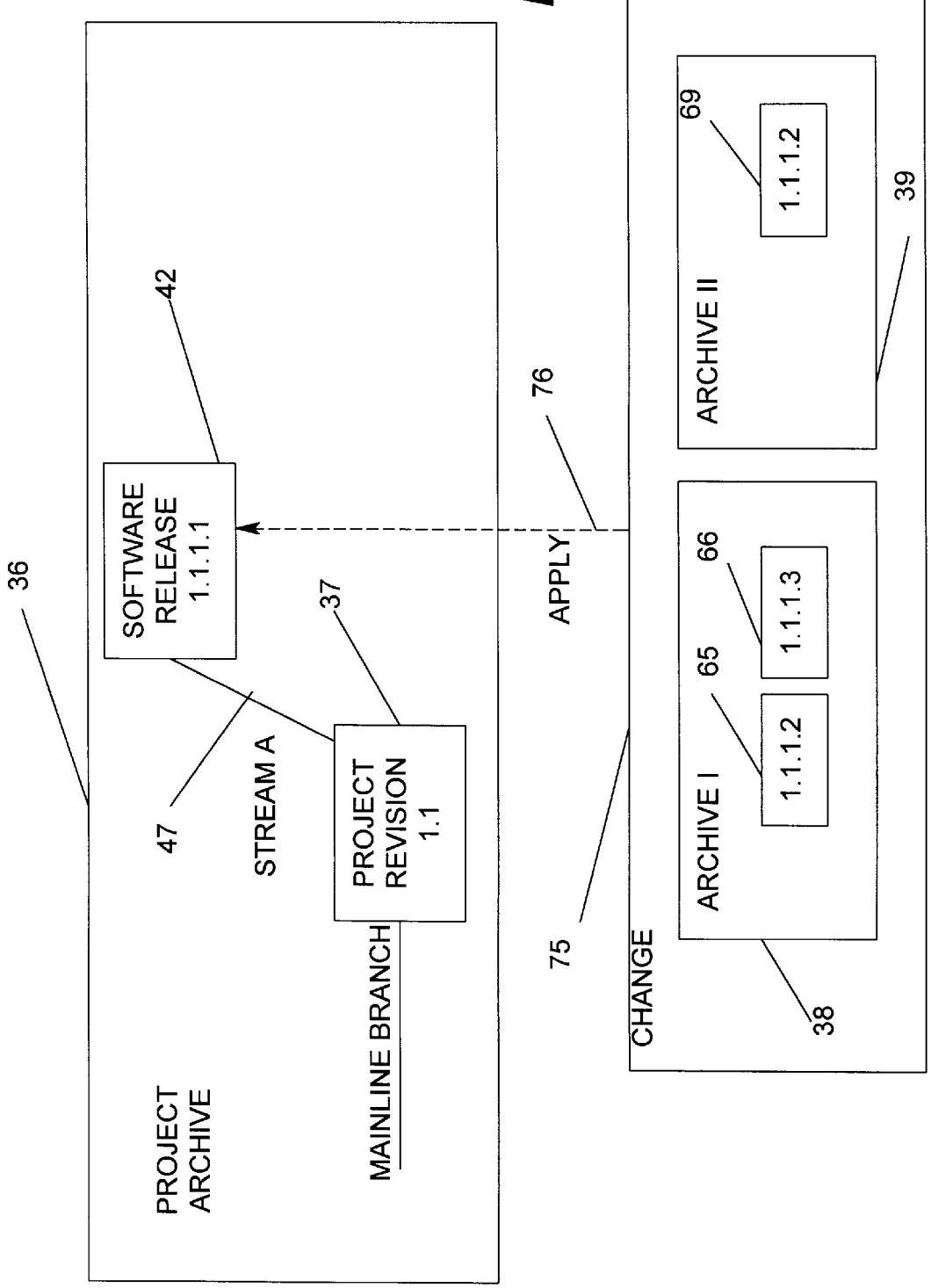

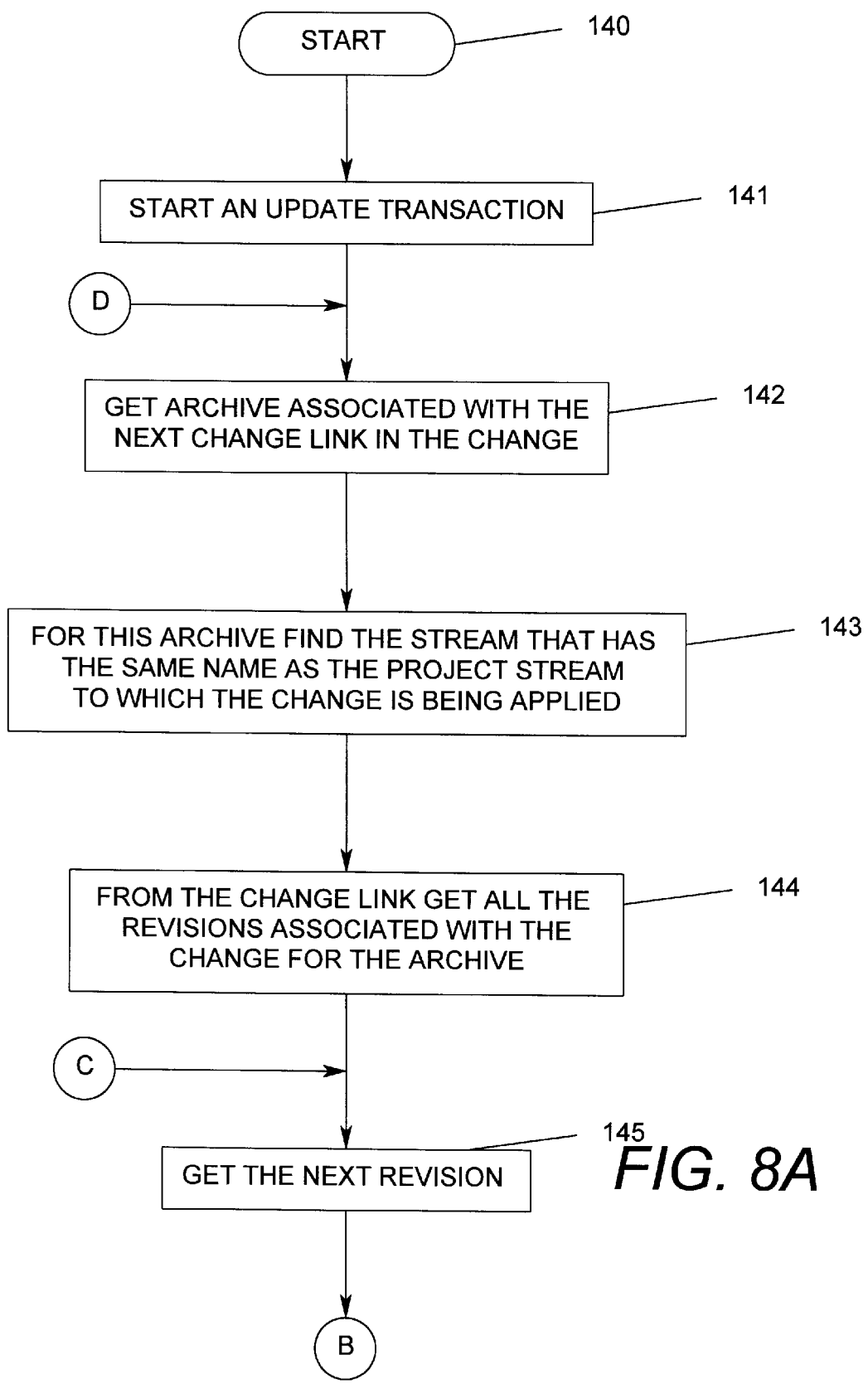

SYSTEM AND METHOD FOR INCORPORATING CHANGES AS A PART OF A SOFTWARE RELEASE

CROSS REFERENCE TO RELATED APPLICATIONS

This patent document relates to the following patent applications, assigned to the same assignee hereof, which are incorporated herein by reference. {10871} U.S. Ser. No. 09/409,107, filed concurrently, entitled A METHOD AND SYSTEM FOR CREATING AND MANIPULATING EXTENSIONS TO VERSION CONTROL SYSTEMS.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of managing the development and release of software programs and more particularly to a change control mechanism for selectively releasing changes to software programs.

BACKGROUND OF THE INVENTION:

Version control, also known as source code control or revision control, is a component of configuration management. The objective behind version control is to enable a particular "snapshot" of a development process to be recovered at some stage in the future (i.e. after the development has moved on from the snapshot time). Without version control a project can encounter the following difficulties:

After a software release is made and shipped to a customer a new software release is made, theoretically providing enhancements or fixing bugs. The customer later complains that the new release has one particular bug that prevents the software from being usable, and the customer wants to "roll-back" to the previous release until this bug is fixed. Without version control, there is no roll-back mechanism.

While a software developer is making a change to a source code file, a serious mistake is made, and the developer needs to recover the file to the point before the change was made. Without version control, there is no recovery mechanism.

After new software release is made and shipped to a customer, they wish to be given a list of changes that have been made to the software since the previous release. No change control mechanism is available without version control.

Prior art in this area focuses on releasing software as a collection of file versions that incorporate all the changes that were made since the previous release. A change may represent features that have been added, deleted or modified since the last release. Since there was no method for distinguishing one change from another within a file version, there is no way for selectively releasing changes. Thus, the prior art suffers from inflexibility when it comes to classifying a software release as a set of select changes, where each change represents a feature of the software release.

SUMMARY OF THE INVENTION

An object of the present invention is to provide a method for selectively releasing changes as a part of a software release.

Another object of the present invention is provide a method for storing versions as changes to files, which eliminates the need to store entire files of new versions resulting in a savings of storage.

These and other objects, which will become apparent as the invention is described in detail below, are provided by a method in a computer system capable of executing a version control program, wherein the method operates within the version control program for incorporating changes to software releases. The method creates a project archive object that manages all resources for each of the software releases and then creates a branch in the project archive object in order to establish a new project revision object of the project archive objects. Next, a project revision object is established and is disposed on the branch for incorporating a revision of the project archive object. After this, archive objects are added to the project revision object and revisions are received from a user to each of the archive objects. A change object is established for the project revision, which logically groups a set of revisions to be released. A stream is then created from the project revision object in order to establish a new project revision object of the project archive object, thereby establishing the new project revision object as a software release object. The software release object is then disposed on the stream for incorporating a revision of the project archive object. Finally, the change object is applied to the software release object after it is determined that a change is ready for release.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIGS. 5A through 5E illustrate a sequence of five parts of the concept of applying a change to a project release using the method of the present invention.

FIGS. 8A and 8B combined form a flow chart of the process for applying a change to a Project Revision.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

Figure 1:
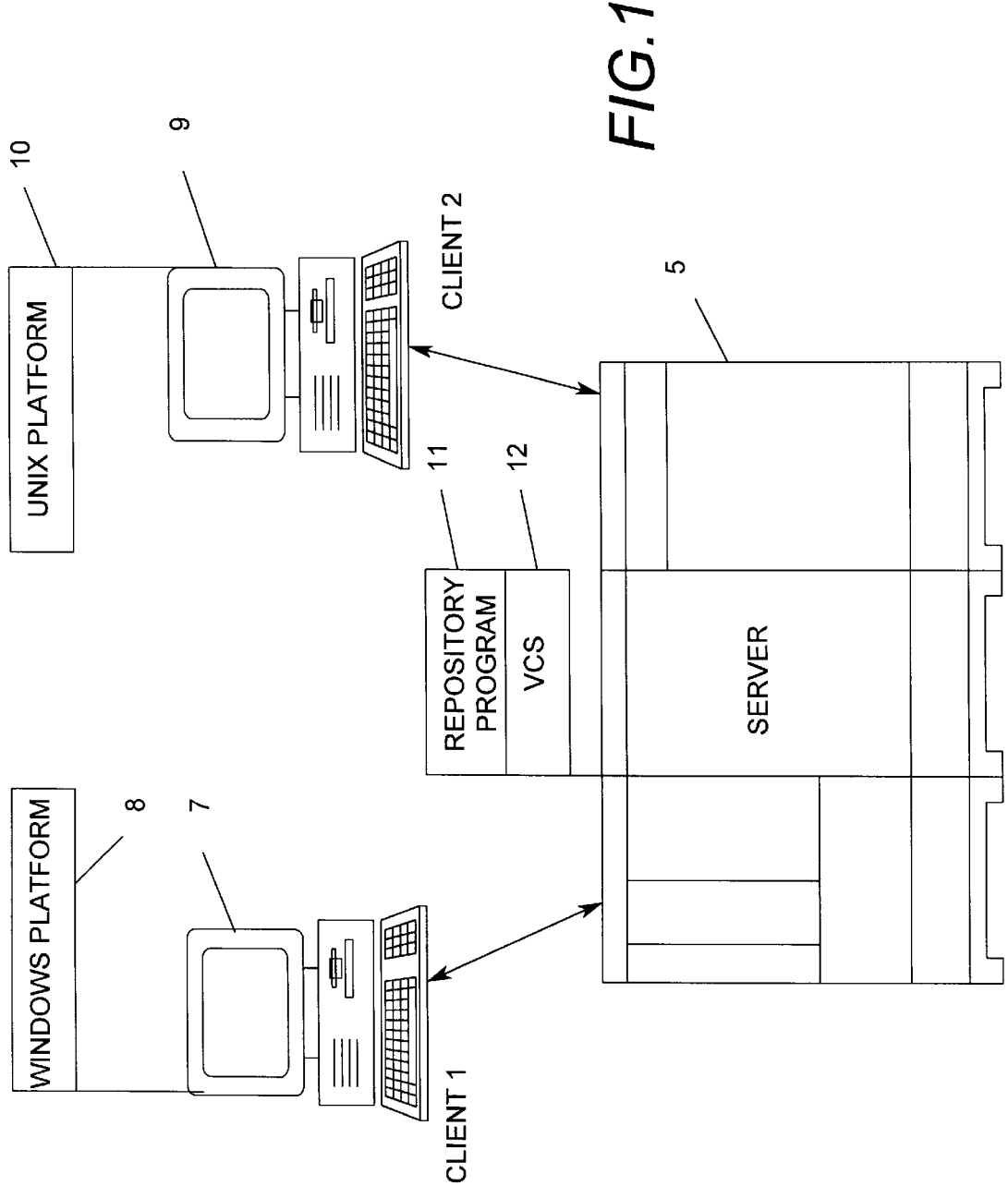
FIG. 1 is a block diagram of a computer system useful in implementing the system and method of the present invention.

Referring now to the drawings and FIG. 1 in particular, a block diagram of a computer system useful in implementing the system and method of the present invention is shown. A server 5 is adapted for coupling to a first client 7 (Client 1 as shown in FIG. 1) operating on a Windows platform 8 and a second client 9 (Client 2 as shown in FIG. 1) operating on a UNIX platform 10. The server 5 is capable of executing a repository program 11, including a Version Control System (VCS) 12 of the present invention.

The repository 11 further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN AN OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
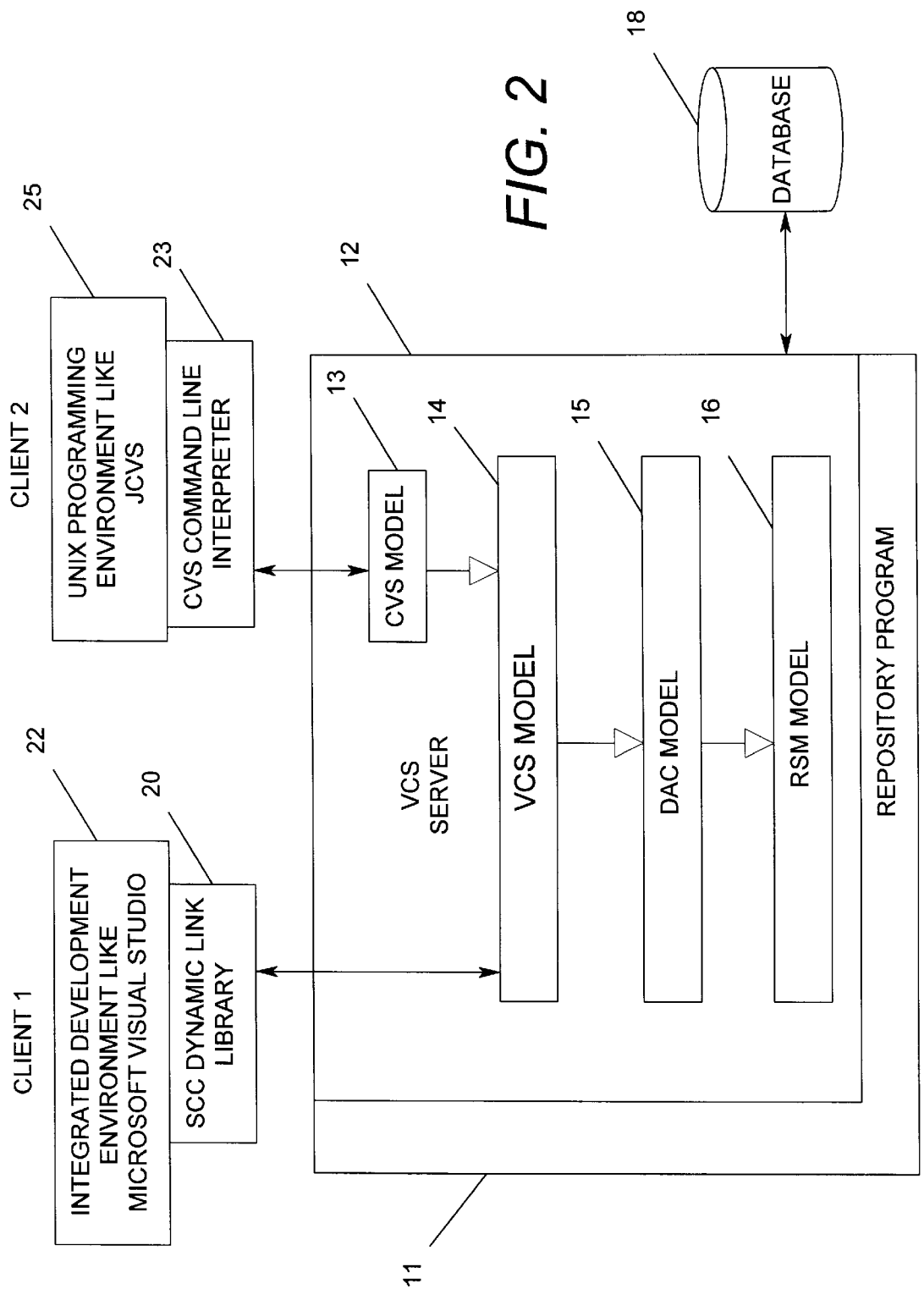
FIG. 2 is a modular block diagram of the system and method of the present invention.

Referring now to FIG. 2, a modular block diagram of the system and method of the version control system ("VCS") of the present invention is shown. The VCS program 12 contains a Concurrent Version System ("CVS") model 13, a VCS model 14, a Domain Access Control ("DAC") model 15 and a Repository Services Model ("RSM") 16. The repository 11 is linked to a permanent storage device containing a database 18.

The computer 7 (or Client 1 as shown in FIG. 1) includes a Dynamic Link Library 20 that implements a Source Code Control ("SCC") Application Program Interface ("API"). The Library 20 allows the VCS to integrate with many popular Integrated Development Environments ("IDE"), such as Environment 22. Thus, this invention takes advantage of the standard SCC API implemented in most IDEs to allow the user to interface with the repository 11 and in turn the VCS program 12. When a user wants to access any of the multiplicity of functions defined in the SCC API, the Library 20 puts up a dialog box to request information from the user and to offer options to the user as may be appropriate for the called SCC function. This information is passed to the VCS model 14 to complete the set of commands defined by that SCC API function.

The computer 9 (or Client 2 as shown in FIG. 1) also contains an implementation of a Concurrent Version System ("CVS") command line interpreter 23 that maps each CVS command to one or more operations in the VCS technology model 14. CVS is a popular UNIX command line oriented version control system. The interpreter 23 thus provides an interface between the user of a GUI for CVS (e.g., jCVS and tkCVS) included in a UNIX Programming environment 25 and the VCS technology model 14. The tkCVS package is one of the more popular GUI for CVS. This will permit GUIs written for CVS to work with the VCS technology model 14.

The CVS model 13 maintains information about users who are accessing the VCS model.

The VCS technology model 14 provides the configuration management functionality utilizing many of the services provided by the Repository Services Model ("RSM") 16. Some of these services are as follows:

RSM name service is used to name and locate storage for files, directories, users and project objects in the VCS model.

RSM interoperability service provides a client/server architecture across Windows and UNIX platforms.

RSM user and session service provides user information and.

RSM collection service and transaction service are also used by the VCS.

The Domain Access Control ("DAC") model 15 provides user access control to objects in the repository 11 that belong to access domains. An access domain consists of an instance of a class derived from the class AccessController defined in the DAC model together with a set of persistent objects that reference the access controller to determine user access to their features. When a user wishes to access a feature, the operation isAAccessAllowed defined in Access Controller is called to determine if the user has appropriate permission to access that feature and only when this test is positive does the DAC model 15 allow the user to access the feature. If the DAC model 15 denies user access to a feature, an error is reported.

Figure 3:
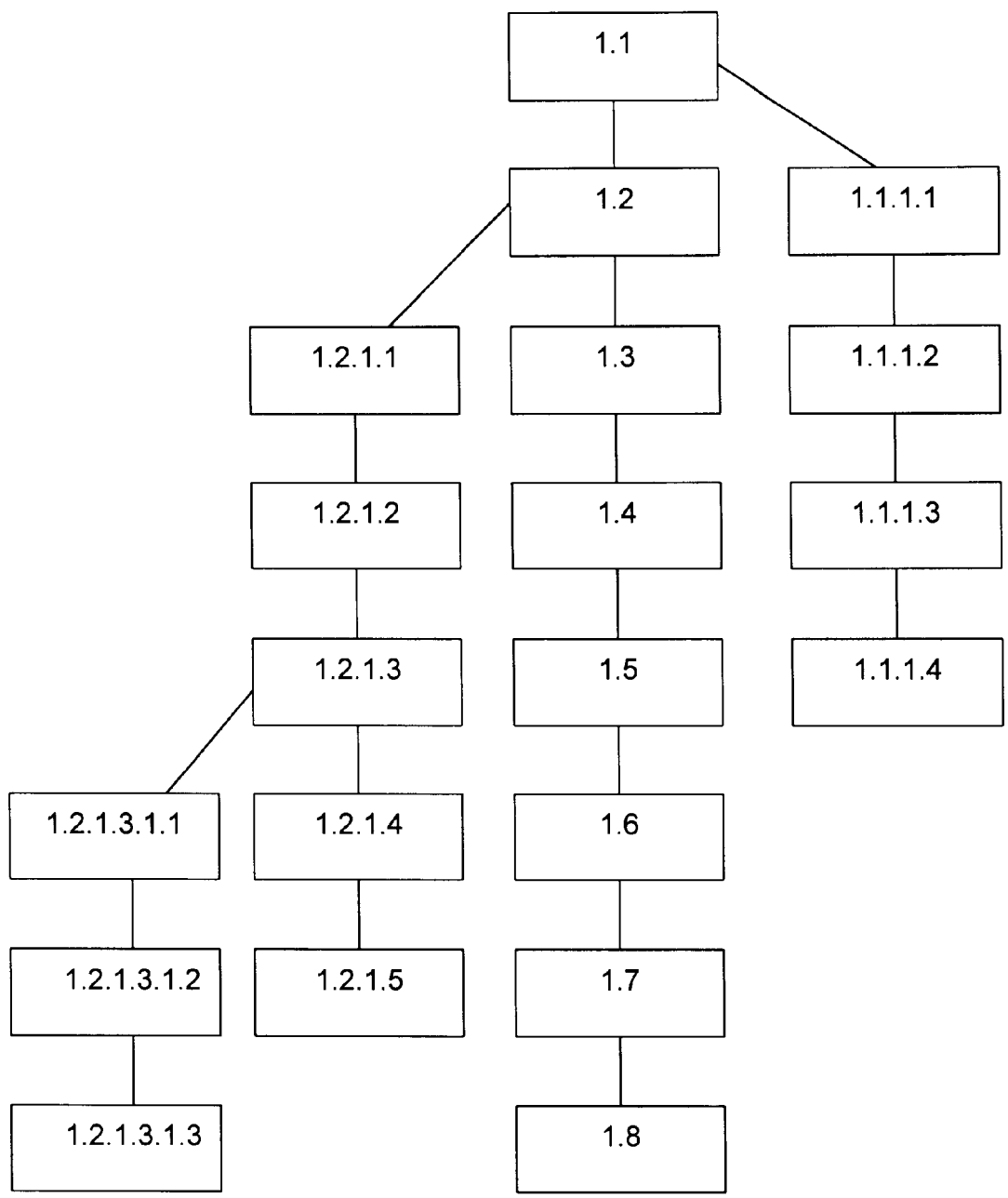
FIG. 3 is a diagram of a typical version tree.

Referring to FIG. 3, a version tree that may typically be used in the method of the present invention is illustrated. A version tree is built from an archive and a set of revisions. An archive is a collection of snapshots of the represented object's properties and contents over a period of time. It contains attributes of the object it represents and a record or history of all the revisions that have been made to that object. A revision is a reproduction of the object as it existed at some point in time. When an archive is created in VCS a branch is created for its initial revision. The name of this branch is "mainline". The tree shown in FIG. 3 illustrates the version identifiers for a version tree where vertical lines join consecutive revisions in the same branch and diagonal lines represent new branches created by branch operations.

A version identifier in VCS identifies each revision in VCS. The version identifier consists of a major and a minor version number. The major version number represents the branch number for the set of revisions that belong to a branch, and the minor version number represents the version number for a revision within the branch. The first revision of an archive has a value of one for its major version number and its minor version number. The major and minor version numbers are used to form a version identifier. A period is used in a version identifier to separate the major and minor version numbers. Thus, the version identifier for the first revision of an archive is "1.1" and a branch version identifier may be "1.1.1.1" followed by subsequent revisions, such as "1.1.1.2", "1.1.1.3" et seq.

Figure 4:
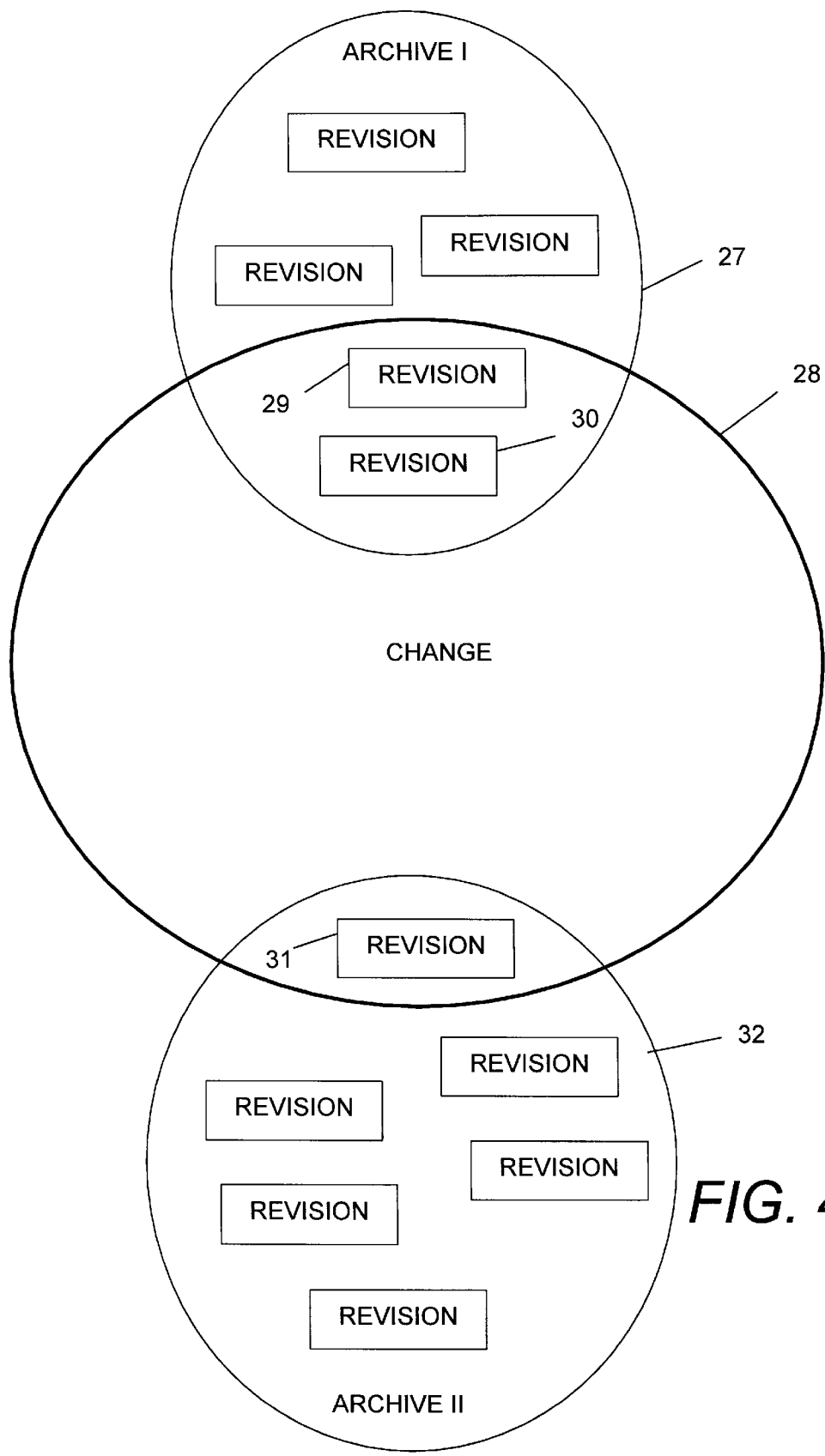
FIG. 4 is a diagram illustrating the concept of change in the VCS system of the present invention.

Referring to FIG. 4, where the concept of a change in VCS is illustrated. A change in VCS defines a logical unit of work or a task for a project. A circle 27 represents Archive I, a circle 28 represents a change that includes one or more revisions shown by blocks 29, 30 and 31; and, a circle 32 represents Archive II. The revisions included in a change can belong to one or more archives. Thus, revisions 29 and 30 are from Archive I while revision 31 is from Archive II. The change keeps track of the Archives and the revisions from those Archives that were modified as part of the change. A change can be associated with a workspace. Each time a revision is checked out to the workspace it is added along with its archive to the change. In this way, VCS knows what Archives and what revisions from the Archive that make up a change.

FIGS. 5A through 5E illustrate a sequence of five parts of the concept of applying a change to a project release.

Figure 5A:
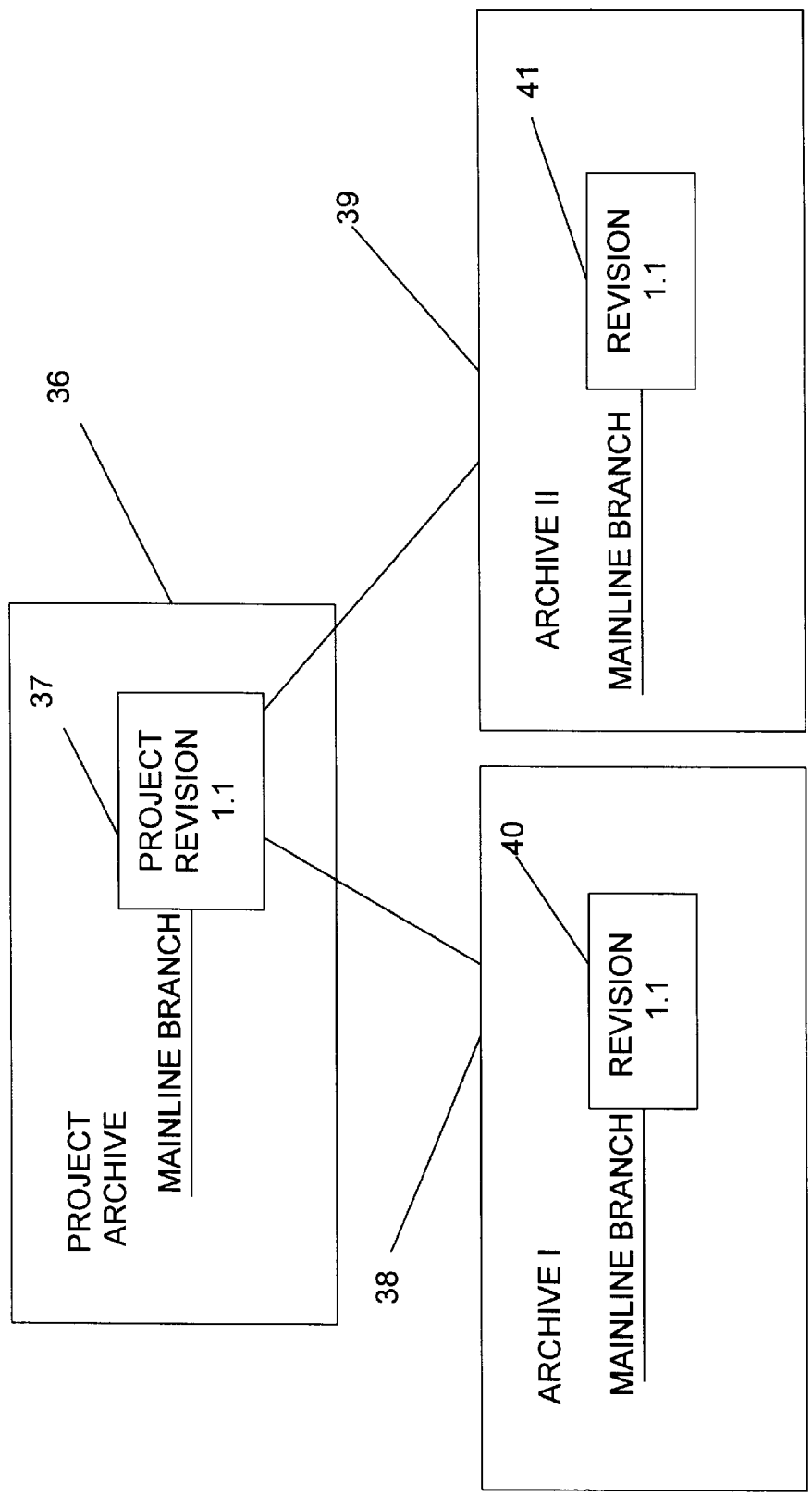

Referring now to FIG. 5A, the first part of the sequence illustrates the concept of a Project revision and its associated archives. A Project Archive 36 having a mainline branch that associates the Archive to its first Project Revision 37 is shown. The Project Revision 37 can have one or more archives, such as Archives I and II as depicted by blocks 38 and 39, respectively. Each archive belonging to a Project Revision can have their own revisions lying on their respective mainline branches. Thus, revision 40 and revision 41 belong to archives 38 and 39, respectively. These revisions contain a snapshot of the objects represented by the respective archives at some point in time.

Referring now to FIG. 5B, the second part of the sequence, which shows the concept of a stream, is illustrated. A stream is a branch of a version tree with additional semantic constraints. Checking out a revision from a stream and checking in a revision to a stream is prohibited. Merging a branch with a stream is also not permitted. Line 47 between blocks 37 and 42 is a stream for Project Archive 36 containing Project Revision 42. A project revision on a stream is referred to as a project release or software release. Similarly, within Archives I and II, the streams named Stream A (lines 48 and 49, respectively) are streams for Archive 38 (I) and Archive 39 (II) containing revisions 43 and 44, respectively. Creating the stream in a project archive causes VCS to create the corresponding stream in each archive contained in a project archive. Thus, the Stream A in the present example created in Project Archive 36 is also present in each of the archives 38 and 39 contained in the Project Revision.

Figure 5C:
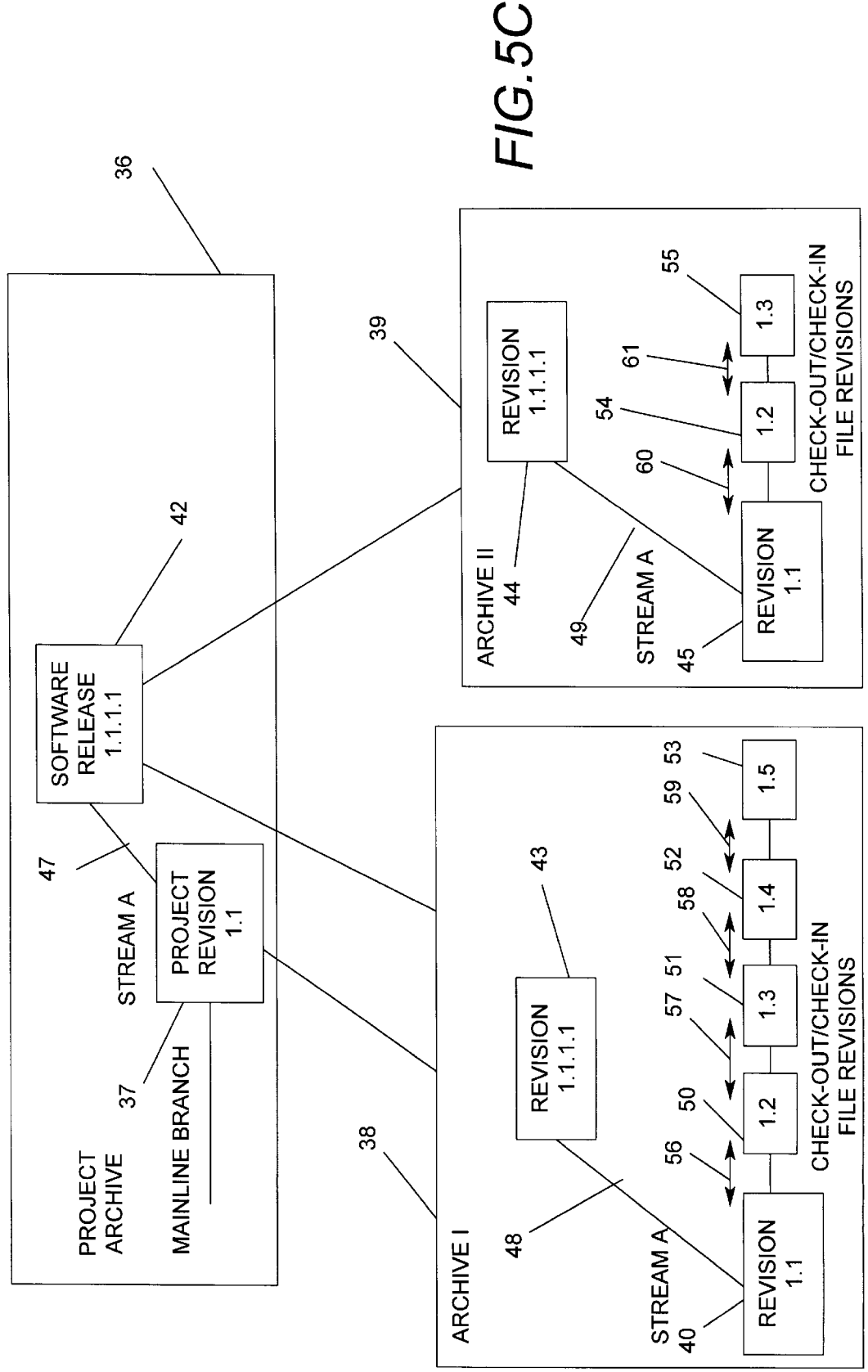

Referring to FIG. 5C, which is the third of the five-part sequence, the concept of checking-in and checking-out revisions to create deltas is shown. A check-out function in VCS allows a developer to retrieve a revision from an archive for editing; and, a check-in function in VCS allows a developer to create a new revision in the archive from the revision that was previously checked-out by the same developer. A delta contains information about an update made to a source revision. A set of deltas that represent all the updates made to a source revision allows the revised revision of the source revision to be built from the source revision and the set of deltas. Thus, a set of deltas is created for the new revision when a revised revision is checked in by a developer so that only one complete revision of the source file must be stored in the repository.

In FIG. 5C, the set of deltas 56 records the differences between revisions 40 and 50. Similarly, set of deltas 61 records the differences between revisions 54 and 55. Likewise, the sets of deltas 57, 58, 59 and 60 record differences between two successive revisions on the same branch.

Referring to FIG. 5D, the concept of applying a revision to a stream in an archive is shown. A revision can be created on a stream by selecting a revision from the branch from which the stream originates and passing it to the apply operation in the software release for the stream. The apply operation creates a new revision on the stream that is the result of applying the deltas from the selected revision on the branch to the last revision in the stream. The new revision created in the stream may differ from the selected revision from the branch because not all of the revisions that come before it on the branch have been applied to the stream. Thus, in the example shown in FIG. 5D, revisions 51 and 53 are applied to create revisions 65 and 66 on the Stream A of Archive 38. Similarly, the developer applies just one revision 55 to create revision 69 on the Stream A of Archive 39. The apply operation is shown by the broken arrows 67, 68 and 70, respectively.

FIG. 5E is the last in the sequence of five parts that illustrate the concept of creating a software release. This final part shows the concept of applying a change to a software release. As described hereinabove with reference to FIG. 4, a change is a logical grouping of one or more archive revisions.

After being tested, inspected and approved a change will be ready to be incorporated into a software release The change being incorporated logically groups the archive revisions corresponding to the particular unit of work or task that has been completed for the software release. For example, in FIG. 5E, change 75 logically groups two archive revisions 65, 66 belonging to archive 38; and, the single archive revision 69 belonging to archive 39. Further, the change 75 is applied via an apply change operation 76 to the software release 42.

Figure 6A:
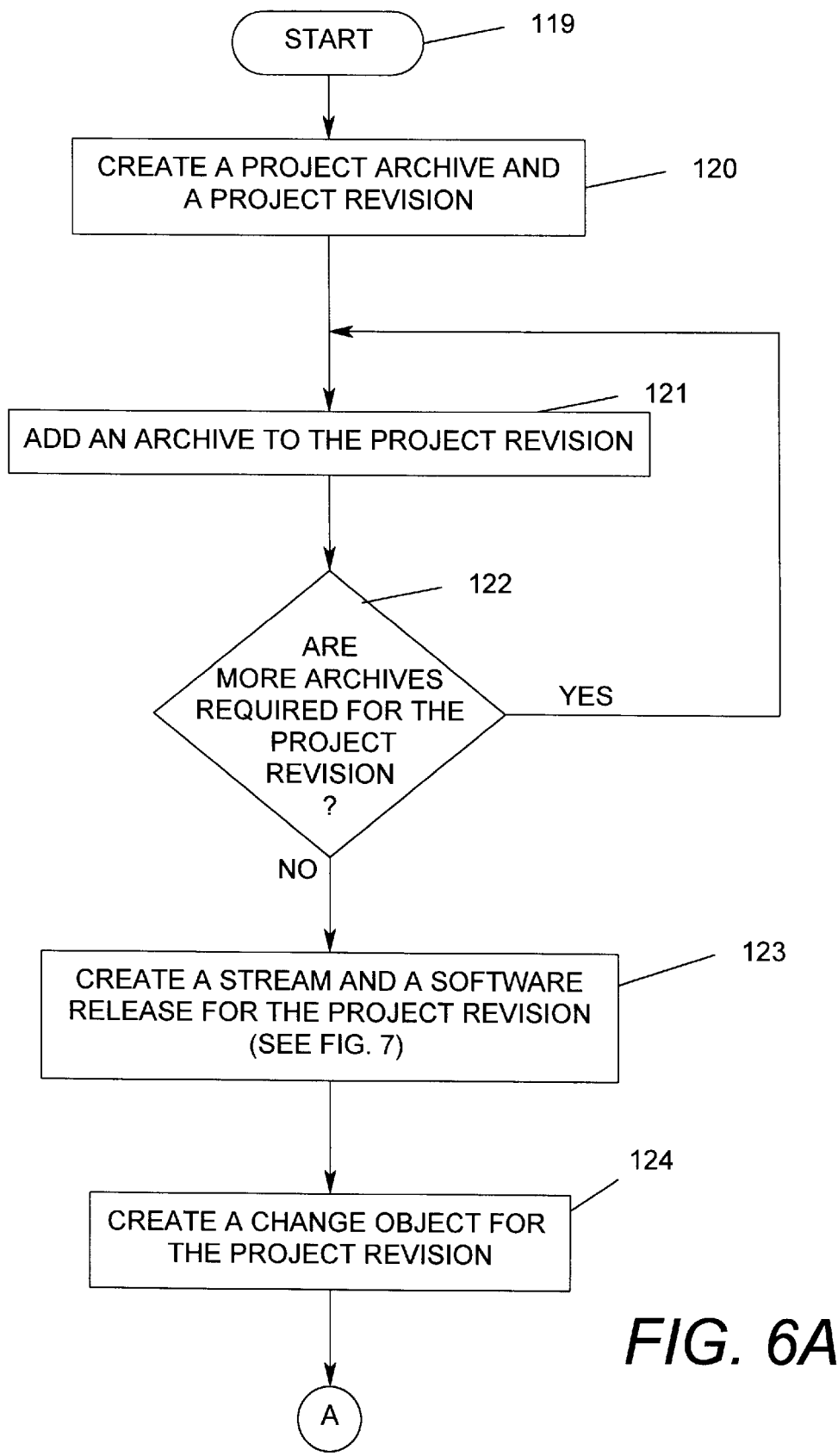
FIGS. 6A and 6B combined form a flow chart of the method of the present invention.

Referring now to FIG. 6A, the first of a two-sheet illustration of the process of the present invention is shown. The process begins with a start bubble 119 followed by a step of creating a Project Archive and a Project Revision (block 120). Next, an Archive is added to the Project Revision (block 121) followed by an inquiry as to whether or not more Archives are required for the Project Revision (diamond 122). If the answer to this inquiry is yes, then a return is made back to the preceding step to add another Archive to the Project Revision. On the other hand, if the answer to this inquiry is no, then a Stream and a software release for the Project Revision is created (block 123). The step depicted by the block 123 is amplified in FIG. 8 and described further hereinbelow.

Following the above, a change object for the Project Revision is created (block 124). The process illustration continues in FIG. 7B as denoted by a connector A.

Figure 6B:
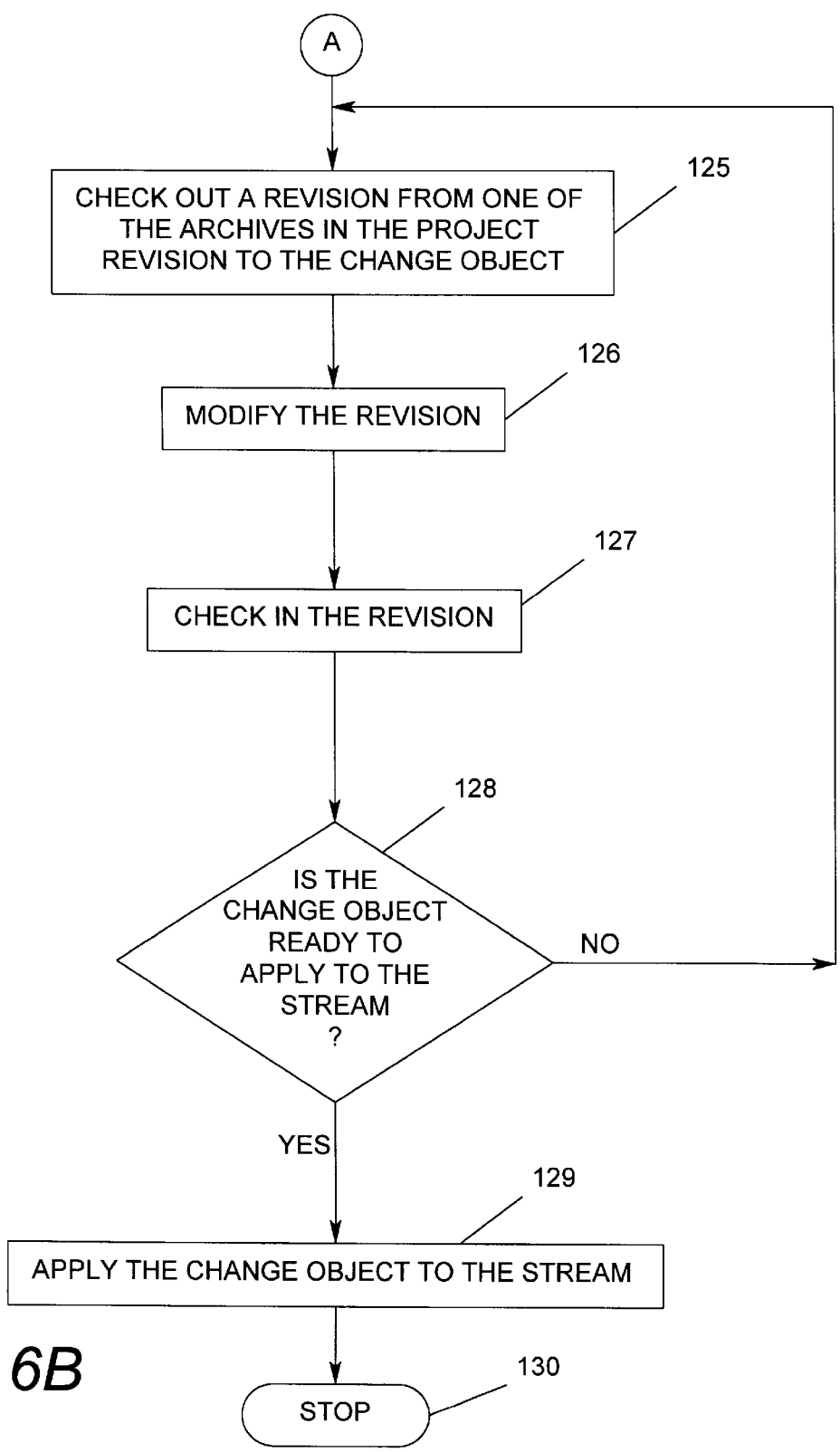

Referring now to FIG. 6B at the connector A, a revision from one of the Archives in the Project Revision is checked out to the change object (block 125). Next, the revision is modified (block 126) and then checked back in (block 127). After this, an inquiry is made as to whether or not the change object is ready to apply to the Stream (diamond 128). If the answer to this inquiry is no, then a return is made back to the step depicted by the block 125. On the other hand, if the answer to this inquiry is yes, then the change object is applied to the Stream (block 129). After this the process ends (bubble 130).

Figure 7:
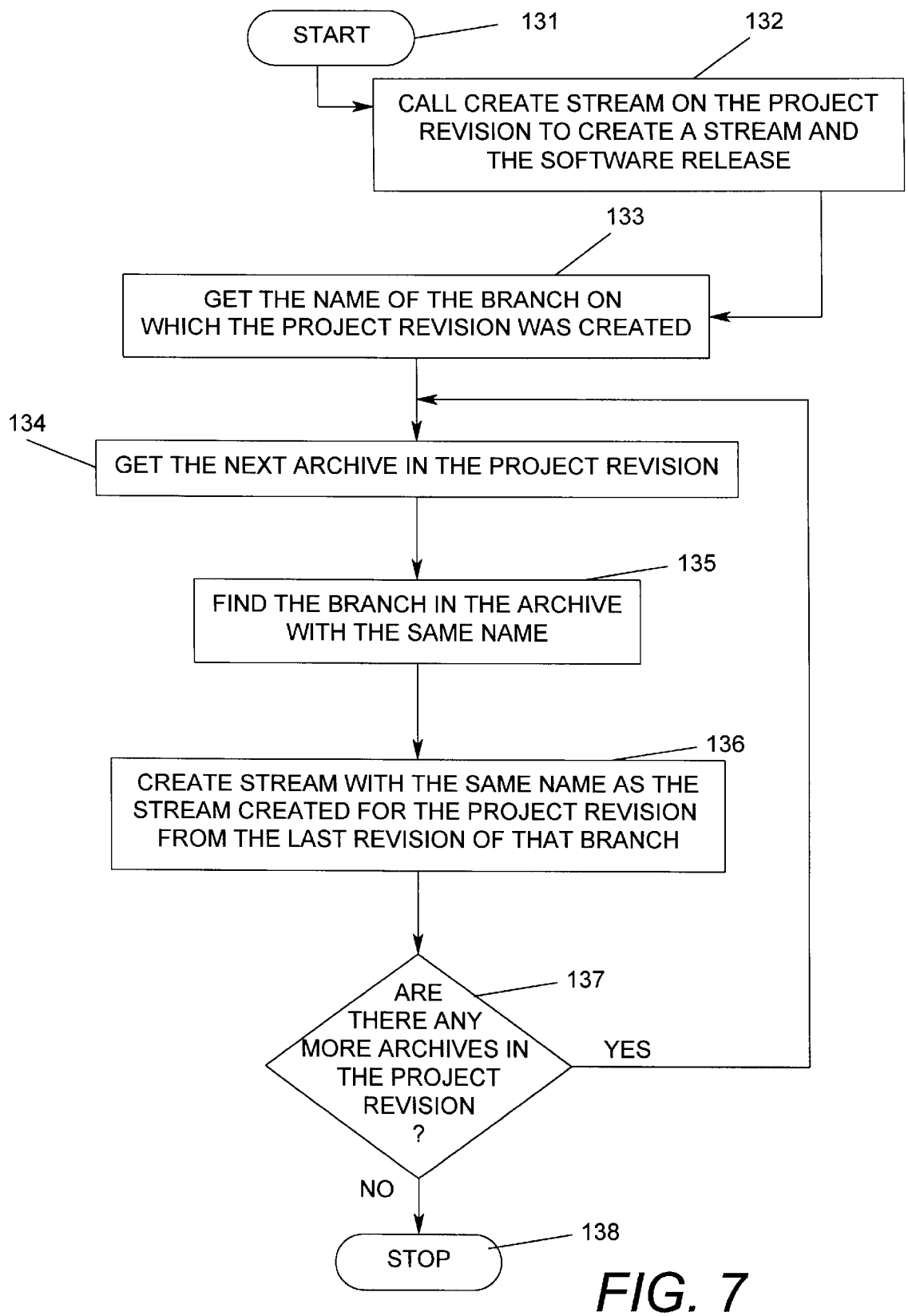
FIG. 7 is a flow chart of the process for creating a stream for a Project Revision.

Referring now to FIG. 7, a flow chart of the process for creating a Stream and a software release for the Project Revision is shown. The process begins with a start bubble 131 followed by a step of calling create stream from the project revision to create the stream and the software release in the project archive (block 132). Next, the name of the branch on which the Project Revision was created (block 133). Next, the first Archive in the Project Revision is obtained (block 134) followed by a step of finding the branch in the Archive with the same name (block 135). After this, a Stream is created with the same name as the Stream created for the Project Revision from the last revision of that branch (block 136). An inquiry is next made as to whether or not there are any more Archives in the Project Revision (diamond 137). If the answer to this inquiry is yes, then a return is made back to the step depicted by the block 134 for the next Archive in the Project Revision. On the other hand, if the answer to this inquiry is no, then the process stops (bubble 138).

Figure 8B:
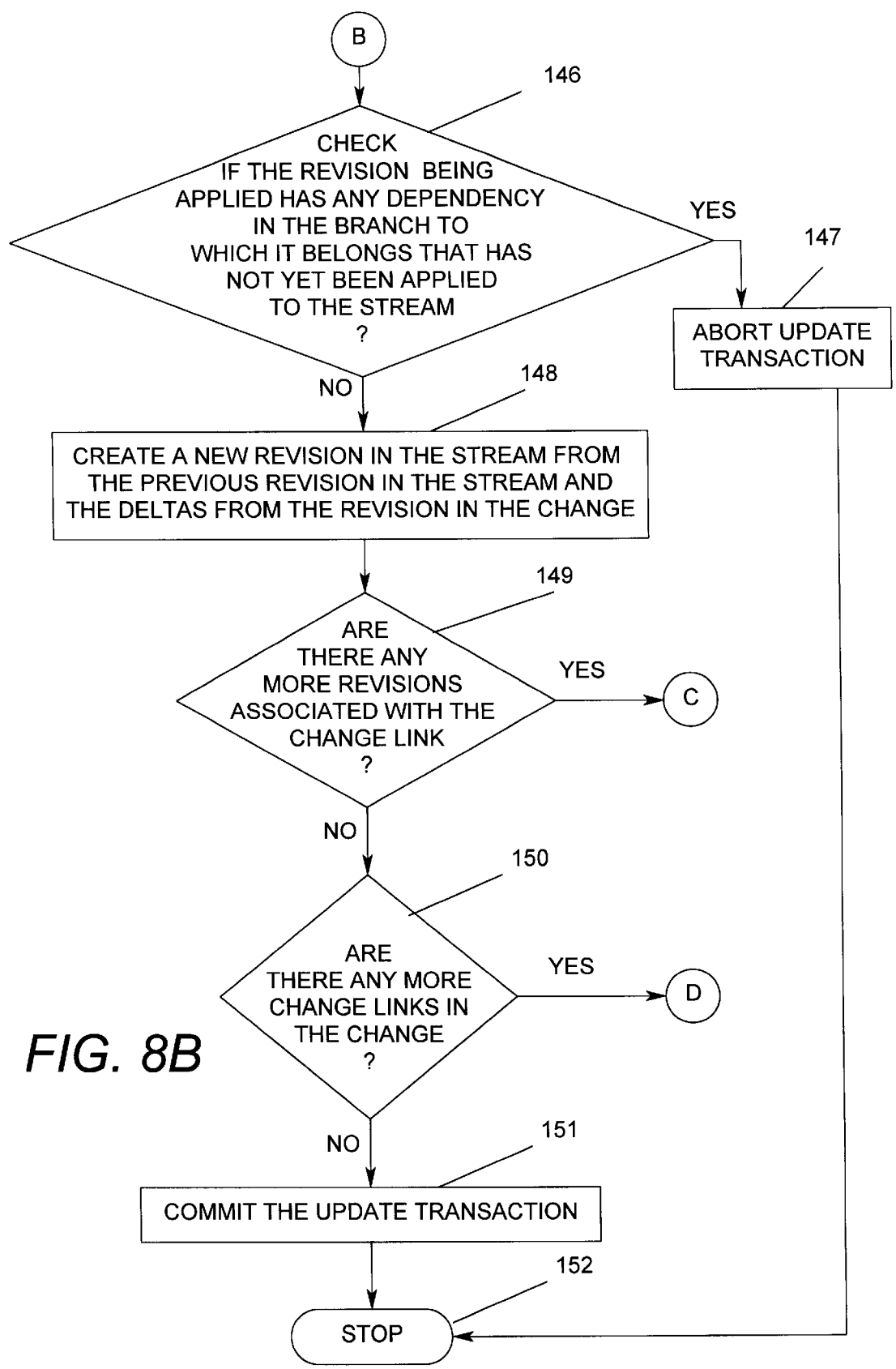

Referring now to FIGS. 8A and 8B, a two-sheet flow chart illustrates the process for applying a change to a Project Revision. The process begins with a start bubble 140 followed by a step of starting an update transaction (block 141). Next, an Archive associated with the first change link in the change is obtained (block 142). For this Archive, the Stream that has the same name as the stream containing the software release to which the change is being applied is obtained (block 143). From the change link, all revisions associated with the change for the Archive are obtained (block 144). After all this, the first revision is obtained (block 145). The process illustration continues in FIG. 8B as denoted by a connector B.

Referring now to FIG. 8B at the connector B, an inquiry is made as to whether or not the revision being applied has any dependency in the branch to which it belongs that has not yet been applied to the stream (diamond 146). If the answer to this inquiry is yes, the update transaction is aborted (block 147) and the process ends (bubble 152). On the other hand, if the answer to this inquiry is no, then a new revision is created in the stream from the previous revision on the stream and the deltas for the revision from the change (block 148). Another inquiry is then made as to whether or not there are any more revisions associated with the change link (diamond 149). If the answer to this inquiry is yes, then a branch is made back to the step depicted by the block 145 (FIG. 8A) as denoted by a connector C.

On the other hand, if the answer to this inquiry is no, then yet another inquiry is made as to whether or not there are any more change links in the change (diamond 150). If the answer to this inquiry is yes, then a branch is made back to the step depicted by the block 142 (FIG. 8A) as denoted by a connector D. On the other hand, if the answer to this inquiry is no, then the update transaction is committed (block 151) and the process ends (bubble 152).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system capable of executing a version control program, a method within said version control program for incorporating changes to software releases, said method comprising the steps of:

a. creating a project archive object that manages all resources for each of said software releases;

b. creating a branch in said project archive object in order to establish a new project revision object of said project archive object;

c. establishing a project revision object, said project revision object being disposed on said branch for incorporating a revision of said project archive object;

d. adding archive objects to said project revision object and receiving revisions from a user to each of said archive objects;
e. establishing a change object for said project revision that logically groups a set of revisions to be released;
f. creating a stream from said project revision object in order to establish a new project revision object of said project archive object, thereby establishing said new project revision object as a software release object, said software release object being disposed on said stream for incorporating a revision of said project archive object; and,
g. applying said change object to said software release object after it is determined that a change is ready for release.

2. The method as in claim 1 wherein said version control program operates within a repository program.

3. The method as in claim 1 where in step f thereof further including the step of creating an additional stream having the same name as said stream for each archive contained within said project revision.

4. The method as in claim 1 where in step e thereof further including the steps of associating a change object with a workspace and including in said change object each check-in of a revision to said workspace.

5. The method as in claim 1 where in step g thereof applying said change object further includes the step of creating a delta from successive revisions that is to be applied to said stream.

6. The method as in claim 5 further including the step of applying said delta created in the preceding step in lieu of applying a complete revision.

7. A storage medium encoded with machine-readable computer program code for incorporating changes to software releases, wherein, when the computer program code is executed by a computer, the computer performs the steps of:
a. creating a project archive object that manages all resources for each of said software releases;
b. creating a branch in said project archive object in order to establish a new project revision object of said project archive object;
c. establishing a project revision object, said project revision object being disposed on said branch for incorporating a revision of said project archive object;
d. adding archive objects to said project revision object and receiving revisions from a user to each of said archive objects;
e. establishing a change object for said project revision that logically groups a set of revisions to be released;
f. creating a stream from said project revision object in order to establish a new project revision object of said project archive object, thereby establishing said new project revision object as a software release object, said software release object being disposed on said stream for incorporating a revision of said project archive object; and,
g. applying said change object to said software release object after it is determined that a change is ready for release.

8. The storage medium as in claim 7 wherein said version control program operates within a repository program.

9. The storage medium as in claim 7 where in step f thereof further including the step of creating an additional stream having the same name as said stream for each archive contained within said project revision.

10. The storage medium as in claim 7 where in step e thereof further including the steps of associating a change object with a workspace and including in said change object each check-in of a revision to said workspace.

11. The storage medium as in claim 7 where in step g thereof applying said change object further includes the step of creating a delta from successive revisions that is to be applied to said stream.

12. The storage medium as in claim 11 further including the step of applying said delta created in the preceding step in lieu of applying a complete revision.

* * * * *